United States Patent [19]

Kierkels et al.

[11] Patent Number: 5,359,024
[45] Date of Patent: Oct. 25, 1994

[54] PROCESS FOR THE PREPARATION OF A PHENOL-FORMALDEHYDE RESIN

[75] Inventors: Renier H. M. Kierkels, Beegden; van Kempen Carolien H. M., Geleen; Henricus A. C. Baur, Herten, all of Netherlands

[73] Assignee: DSM N.V., Heerlen, Netherlands

[21] Appl. No.: 107,199

[22] Filed: Aug. 17, 1993

[30] Foreign Application Priority Data

Aug. 17, 1992 [NL] Netherlands ............... 9201461

[51] Int. Cl.$^5$ ............................................. C08G 8/04
[52] U.S. Cl. ................... 528/137; 528/129; 528/138; 528/144; 528/145; 528/147; 528/148
[58] Field of Search ............... 528/129, 137, 138, 144, 528/145, 147, 148

[56] References Cited

U.S. PATENT DOCUMENTS

| | | | |
|---|---|---|---|
| 3,946,077 | 3/1976 | Thiel et al. | 260/586 B |
| 4,233,408 | 11/1980 | Satterly et al. | 521/272 |
| 4,950,433 | 8/1990 | Chiu | 264/13 |

FOREIGN PATENT DOCUMENTS

| | | | |
|---|---|---|---|
| 150420 | 8/1985 | European Pat. Off. | C08K 5/04 |
| 141036 | 9/1930 | Switzerland | 521/172 |

*Primary Examiner*—John Kight, III
*Assistant Examiner*—Richard Lee Jones
*Attorney, Agent, or Firm*—Cushman, Darby & Cushman

[57] ABSTRACT

The invention relates to a process for the preparation of a phenol-formaldehyde resin by causing phenol and formaldehyde to condense under the influence of a basic catalyst, the catalyst being an aqueous solution containing alkali metal ions, carbonate ions, ions of carboxylic acids and one or more ions chosen from the group comprising transition metal ions and borates.

11 Claims, No Drawings

PROCESS FOR THE PREPARATION OF A PHENOL-FORMALDEHYDE RESIN

FIELD OF THE INVENTION

The invention relates to a process for the preparation of a phenol-formaldehyde resin, by causing phenol and formaldehyde to condense under the influence of a basic catalyst.

BACKGROUND OF THE INVENTION

It is known that a basic catalyst is usually used in the preparation of a phenol-formaldehyde resin using phenol and formaldehyde as starting materials.

Suitable basic catalysts are for example sodium hydroxide, barium hydroxide and calcium hydroxide and organic amines.

Phenol-formaldehyde resins are pre-eminently suitable for impregnating for example paper.

Paper is impregnated with a phenol-formaldehyde resin, dried and stacked. The stack obtained in this manner is cured under pressure, as a result of which a laminate is obtained. In processing the usually flat laminate to a moulded part it is important that the laminate bends easily at temperatures of between 140° and 200° C. The deformability of laminates for this application is called the postforming behaviour.

The laminates are used for for example electrical, insulation and decorative applications.

The fact that laminates obtained in the aforementioned manner do not show optimum postforming behaviour is a drawback.

SUMMARY AND OBJECTS OF THE INVENTION

The aim of this invention is to prepare a phenol-formaldehyde resin with which laminates can be produced that show better postforming behaviour than is possible according to the present state of the art.

This is achieved because the catalyst is an aqueous solution that contains alkali metal ions, carbonate ions, anions of carboxylic acids and one or more ions selected from among transition metal ions and borates.

It has been found that the postforming behavior is substantially improved when a phenol-formaldehyde resin prepared with the aid of such a catalyst is used in a laminate.

Surprisingly, it has been found that other important properties of the laminate thus obtained, such as impact resistance, moisture sensitivity and thermal stability, do not change to such an extent that the laminate no longer meets the imposed quality requirements.

DETAILED DESCRIPTION OF THE INVENTION

The catalyst consists of an aqueous solution that contains alkali metal ions, carbonate ions, anions of carboxylic acids and transition metal ions and/or borates. In general the transition metal ion is an ion of cobalt and/or chromium. In general it is borate, metaborate and/or tetraborate.

The aqueous solution usually has a pH that lies between 8.5 and 14. Preferably the pH lies between 10 and 14 and in particular between 11 and 12. It is important that the pH is higher than 8.5 because otherwise the carbonate decomposes to carbon dioxide and other substances.

The anions of carboxylic acids generally have between 1 and 12 carbon atoms. The carboxylic acids may optionally be hydroxylated mono- and dicarboxylic acids. These anions of carboxylic acids will generally be present in the aqueous solution as a dissolved alkali-metal salt of the carboxylic acid.

Examples of possible carboxylic acids are formic acid, acetic acid, oxalic acid, propionic acid, malonic acid, butyric acid, succinic acid, valeric acid, glutaric acid, hexanoic acid, adipic acid, 2-hydroxyhexanoic acid, heptanoic acid, octanoic acid, nonanoic acid, dodecanoic acid, pimelic acid, suberic acid and azelaic acid.

The concentration of anions of carboxylic acids in the aqueous solution expressed in the concentration of organically bound carbon is between 3 and 40 wt. %, preferably between 10 and 30 wt. %.

Possible alkali metal ions are sodium and potassium ions. The concentration of alkali metal ions in the aqueous solution is generally between 3 and 13 wt. %, preferably between 4 and 9 wt. %.

The concentration of carbonate ions in the aqueous solution is generally between 2 and 20 wt. % and preferably between 3 and 8 wt. %.

The amount of transition metal ions or borate in the aqueous solution is generally between 3 and 100 ppm and preferably between 4 and 50 ppm.

A solution that is formed in a process as described in U.S. Pat. No. 3,946,077 can very advantageously be chosen as the catalyst described above. U.S. Pat. No. 3,946,077 describes how in an alkane oxidation process an organic process stream is treated with an alkali solution to saponify the esters present and to separate the carboxylic acids released through the saponification or otherwise. The solution that is formed in this process, the saponification lye, hereinafter referred to as aliali solution, has a composition that now appears to be applicable as a catalyst.

The main portion of the transition metal ion or boron in the form of boric acid that is used as the catalyst in the alkane oxidation process also ends up in this aqueous alkali solution.

The alkali solution is usually regarded as a worthless stream, from which the organic substances present as well as the transition metal or boron have to be removed on account of environmental requirements. In particular this applies to the alkali solution that is formed in a cyclohexane oxidation process. Many attempts have already been made to process this alkali solution in a satisfying manner.

GB-A-1398293 proposes to burn the alkali solution. Objections to this process are that the alkali melt residue thus obtained has a great digesting power with respect to all materials used for brickwork in the combustion oven. Another drawback is that the transition metal or boron is entrained with the combustion off-gas, which entails an unacceptable burden on the environment.

The already-mentioned U.S. Pat. No. 3,946,077 describes a process according to which the organic salts in the alkali solution are oxidized at a temperature of at least 200° C. and at elevated pressure.

A drawback of this process is that extra process steps and energy are necessary to carry out this process. An additional drawback is that this process does not remove the transition metal or boron present in the alkali solution.

By now using this alkali solution as a catalyst in the preparation of phenol-formaldehyde resins according to a process according to the invention, the aforementioned drawbacks are avoided and at the same time a destination is found for the alkali solution that is formed in an alkane oxidation process. In particular this applies to a cycloalkane oxidation process in which the cycloalkane consists of between 5 and 12 carbon atoms. In particular it applies to a cyclohexane oxidation process.

An added advantage is that the alkali solution of the alkane oxidation is a cheap alternative catalyst compared with sodium hydroxide or sodium carbonate in the preparation of phenol-formaldehyde resins.

Phenol-formaldehyde resins can be used in for example rock wool, chipboard, paints, filters and rubbers.

The invention is further elucidated with reference to the following examples, without being limited thereto.

EXAMPLE I 520 g of phenol (90 wt. %; the rest being water) is introduced into a three-liter double-walled reactor. To this was added 100 g of a basic aqueous solution having the following composition:

| NaOH | 1.8 wt. % |
|---|---|
| $Na_2CO_3$ | 7.2 wt. % |
| cobalt | 4.5 ppm |
| sodium salts of: | |
| formic acid | 2.5 wt. % |
| propionic acid | 0.7 wt. % |
| glutaric acid | 2.5 wt. % |
| butyric acid | 2.0 wt. % |
| adipic acid | 2.0 wt. % |
| 2-hydroxyhexanoic acid | 8.0 wt. % |
| valeric acid | 2.0 wt. % |
| hexanoic acid | 1.5 wt. % |

Then the temperature was raised to 85° C. At this temperature 867 g of formaldehyde (31 wt. %) was added dropwise, in 15 minutes. By cooling and slowly adding drops of formaldehyde the temperature was maintained at 90° C. After a reaction time of 1.5 hours the resin solution was cooled to approximately 20° C. The viscosity of the resin solution thus obtained was found to be 40 mPas.

EXPERIMENT A

Example 1 was repeated with the difference that now an NaOH solution was used as the catalyst. The base concentration was 2.2 wt. %, relative to the NaOH. The viscosity of the resin solution thus obtained was found to be 40 mPas.

EXAMPLE II

Kraft paper of 250 g/m² was impregnated with the phenol-formaldehyde resin obtained in Example I. The impregnated paper was then dried in a ventilation oven at 120° C. The resin content of the paper was 45 wt. % (including moisture). The resin-impregnated paper was then compressed to a 1-mm thick high-pressure laminate consisting of three layers of paper. The compression was effected at a temperature of 140° C. and a pressure of 8 MPa. At this pressure the stack of impregnated paper was heated for 15 minutes, maintained at compression temperature for 15 minutes and cooled for 10 minutes. The laminate thus obtained was tested for impact resistance and moisture sensitivity according to ISO 4586 and for postforming behaviour. The postforming test was derived from ISO standard 4586. In this test the laminate is bent over a hot cylinder with a radius of 7 mm to an angle of 90° at 200° C. within 30 seconds. If on visual inspection it was found that cracks or blisters had been formed then the laminate was awarded a "−". An undamaged laminate was awarded a "−". The results are summarised in Table 1.

EXPERIMENT B

A laminate was produced in the same manner as in Example II only now use was made of the resin obtained in Experiment A. The laminate thus obtained was tested for impact resistance, moisture sensitivity and postforming behaviour in the same manner as in Example II. The results are summarised in Table 1.

TABLE 1

| | Example II | Experiment B | HPL requirement |
|---|---|---|---|
| Postforming | + | − | + |
| Impact resistance (N) | 29 | 34 | >25 |
| thermal stability (°C.) | >250 | >250 | >200 |

HPL requirement = the quality requirement for high-pressure laminate

EXAMPLE III

Examples I and II were repeated using a saponification lye obtained in a process as described in EP-A-92867. Comparable results were obtained.

We claim:

1. A process for the preparation of a phenolformaldehyde resin comprising allowing a phenol and formaldehyde to condense in the presence of a basic catalyst which is an aqueous solution that contains alkali metal ions, carbonate ions, anions of carboxylic acid, and at least one ion selected from the group consisting of transition metal ions and borates wherein said aqueous solution has a pH greater than 8.5.

2. A process for the preparation of a phenol-formaldehyde resin according to claim 1, wherein said aqueous solution has a pH between 10 and 14.

3. A process for the preparation of a phenol-formaldehyde resin according to claim 1, wherein said carboxylic acids have from 1 to 12 carbon atoms.

4. A process for the preparation of a phenol-formaldehyde resin according to claim 1, wherein the concentration of anions of carboxylic acids in the aqueous solution, when expressed in the concentration of organically bound carbon, is between 3 and 40 wt. %.

5. A process for the preparation of a phenol-formaldehyde resin according to claim 1, wherein the alkali metal ions are selected from the group consisting sodium ions, potassium ions, and mixtures thereof.

6. A process for the preparation of a phenol-formaldehyde resin according to claim 1, wherein the concentration of alkali metal ions in the aqueous solution is between 3 and 13 wt. %.

7. A process for the preparation of a phenol-formaldehyde resin according to claim 1, wherein the concentration of carbonate ions in the aqueous solution is between 2 and 20 wt. %.

8. A process for the preparation of a phenol-formaldehyde resin according to claim 1, wherein the concentration of the transaction metal ions or borates in said aqueous solution is between 1 and 100 ppm.

9. A process for the preparation of a phenol-formaldehyde resin comprising allowing a phenol and formaldehyde to condense in the presence of a basic catalyst which is an aqueous solution of alkali metal ions selected from the group consisting of sodium, potassium and mixtures thereof; carbonate ions; anions of at least one carboxylic acid selected from the group consisting of formic acid, acetic acid, oxalic acid, propionic acid, malonic acid, butyric acid, succinic acid, volemic acid, glutaric acid, hexanoic acid, adipic acid, 2-hydroxyhexanoic acid, haptenic acid, octanoic acid, nonanoic acid, dodecanoic acid, pimelic acid, sufferic acid, azelaic acid, and at least one additional ion selected from the group consisting of cobalt ions, chromium ions, borate, i.e., meta borate and tetaborate, wherein the aqueous solution has a pH of at least 8.5, the concentration of alkali metal ions in said aqueous solution is between 3 and 13 wt. %, the concentration of carbonate ions in said aqueous solution is between 2 and 20 wt. %, the concentration of at least one additional ion in said aqueous solution is between 1 and 100 ppm, and the concentration of the anions of the at least one carbocyclic acid in said aqueous solution, expressed in the concentration of organically bound carbon, is between 3 and 40 wt. %.

10. A process for the preparation of a phenol-formaldehyde resin comprising allowing a phenol and formaldehyde to condense in the presence of a catalyst, wherein the catalyst is the saponification lye that is formed in a cycloalkane oxidation process and the cycloalkane has 5 to 12 carbon atoms.

11. A laminate based on paper and phenol-formaldehyde resin, wherein the laminate contains salts of alkali metal ions, carbonate ions, and ions of carboxylic acids and ions selected from the group consisting of transition metal ions, borates, and mixtures thereof.

* * * * *